US008016499B2

(12) United States Patent
Narusawa (10) Patent No.: US 8,016,499 B2
(45) Date of Patent: Sep. 13, 2011

(54) PRINTING METHOD WITH RESPECT TO SCANNING A MEDIUM

(75) Inventor: Hideyuki Narusawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/454,807

(22) Filed: May 22, 2009

(65) Prior Publication Data
US 2009/0232571 A1 Sep. 17, 2009

Related U.S. Application Data

(63) Continuation of application No. 11/528,179, filed on Sep. 26, 2006, now abandoned, which is a continuation of application No. 10/952,517, filed on Sep. 27, 2004, now Pat. No. 7,175,355.

(30) Foreign Application Priority Data

Sep. 26, 2003 (JP) .................................. 2003-336137

(51) Int. Cl.
*B41J 11/44* (2006.01)
(52) U.S. Cl. ................. 400/76; 101/35; 101/41; 399/45; 399/379; 399/365
(58) Field of Classification Search .................... 400/79, 400/76; 382/199; 399/45, 379, 365
See application file for complete search history.

(56) References Cited

U.S. PATENT DOCUMENTS 5,915,858 A 6/1999 Wen
5,927,208 A 7/1999 Hagstrom et al.
5,967,676 A 10/1999 Cutler et al.
6,074,111 A 6/2000 Kasahara
6,222,637 B1 4/2001 Ito et al.
6,264,295 B1* 7/2001 Bradshaw et al. ................. 347/2
6,384,929 B1* 5/2002 Miller ........................... 358/1.15
6,438,271 B1 8/2002 Usami et al.
6,525,836 B1 2/2003 Ito et al.
6,552,819 B2 4/2003 Osawa et al.
6,902,256 B2 6/2005 Anderson et al.
7,397,939 B2* 7/2008 Jia et al. ......................... 382/141
2002/0126149 A1 9/2002 Umeda
2003/0048482 A1 3/2003 Kishi et al.
2003/0053099 A1 3/2003 Sakaguchi
2003/0076532 A1 4/2003 Seto

FOREIGN PATENT DOCUMENTS
JP 05238005 A 9/1993
(Continued)

*Primary Examiner* — Matthew G Marini
(74) *Attorney, Agent, or Firm* — Nutter McClennen & Fish LLP; John J. Penny, Jr.; Michael P. Visconti, III (57) ABSTRACT

A user operates the operation panel portion 6 and selects an image quality mode in a pre-stage of carrying out CD-R printing. If an operation of commencing CD-R printing on the operation panel portion 6 is enabled, the CPU 16 causes the scanner unit 21 to scan a sample CD-R 25 and takes in the image data. The CPU 16 causes the taken-in image data to be subjected to an image working process and masks pixels not required to be printed. The ASIC 20 transfers the processed image data to the printer unit 22 and executes CD-R printing. At this time, the CPU 16 carries out scanning and printing at a resolution responsive to the image quality mode.

10 Claims, 7 Drawing Sheets

FOREIGN PATENT DOCUMENTS

| | | |
|---|---|---|
| JP | 09-185227 | 7/1997 |
| JP | 09-247422 | 9/1997 |
| JP | 09269999 A | 10/1997 |
| JP | 09284509 A | 10/1997 |
| JP | 10191215 A | 7/1998 |
| JP | 11041394 A | 2/1999 |
| JP | 2002084416 A | 3/2002 |

* cited by examiner

| TEMPLATE T | Ta | Tb |
|---|---|---|
| MASK INFORMATION | Ka | Kb |

TABLE TB1 FOR SCAN-PRINTING

| CD-R SIZE | Sa (12cm) | Sb (8cm) |
|---|---|---|
| MASK INFORMATION | Kc | Kd |

TABLE TB2 FOR CARD PRINTING

PRINTING METHOD WITH RESPECT TO SCANNING A MEDIUM

This application is a continuation of U.S. application Ser. No. 11/528,179 filed Sep. 26, 2006 which is a continuation application of U.S. application Ser. No. 10/952,517, each of which are hereby incorporated by reference in their entirety. U.S. application Ser. No. 10/952,517 claims priority from JP 2003-336137 filed on Sep. 26, 2003, which is also hereby incorporated by reference in its entirety.

BACKGROUND OF THE INVENTION

1. Field of the Invention

The present invention relates to a printing apparatus capable of independently printing without being connected to, for example, a host computer, and a method for printing on medium.

2. Related Arts

Recently, various types of printers capable of printing images on medium such as CD-R, DVD-R, etc., have been developed. In such printers, a medium on which printing is executed is set in a printer, and data of images to be printed are taken in a host computer. Image adjustment with respect to the position, size and design, etc., of the image data on a medium is carried out, and the adjusted image data are transmitted to a printer. Then, the printer carries out a printing process on the medium on the basis of the image data, whereby a medium of attractive design like CDs and DVDs sold on the market can be completed.

However, a machine capable of independently printing without connection to a host computer, a so-called stand-alone machine is available as a printer. There are some types of such stand-alone printers, for example, a type capable of duplicating, in which a scanner feature and a printer feature are integrally incorporated, and a type having a card slot into which a memory card is inserted, capable of printing images by taking in images from the memory card.

Herein, there is an idea in which a sample CD-R is scanned by using the former type of machine, and the image is printed on a CD-R (printed on a medium). Actually, however, if this method is employed, there is a problem in that shadow portions are printed on a CD-R due to the thickness of the sample CD-R. Also, in the latter machine type, there is no model which is capable of printing image data of a memory card 12 onto a CD-R. That is, development of a printer having such a type of feature has been eagerly desired. In addition, since there are various needs on the users' side with respect to image quality modes where a printer is provided with a medium-printing feature, some measures have been required to reflect respective modes onto the medium printing.

SUMMARY OF THE INVENTION

In at least one embodiment of the present invention provides a printing apparatus and a method for printing, which, even if a feature capable of independently printing on a medium as a single unit is added to a type having a plurality of image quality modes, are capable of securing a function of satisfying the respective image quality modes and capable of improving the functionality of the apparatus.

In order to solve the above-described problem, at least one embodiment of the invention is featured in that a printing apparatus includes an image capture unit which captures a sample medium by scanning or reading data from a memory medium and a printing unit for executing printing on the basis of the image data captured by the capture unit, and includes a processing unit for processing the image data captured by the capture unit in accordance with a printing range of a medium which is a subject on which printing is executed, an operating unit that is operated when selecting a mode among a plurality of image quality modes, and a controlling unit for actuating the capture unit and a print-executing unit in accordance with the image quality mode set by the operating unit and printing the image data processed by the image processing unit onto the medium.

According to the construction, the image processing unit processes the image data captured by the capture unit in accordance with a printing range of a medium being a subject on which the printing is executed. The controlling unit actuates the capture unit and print-executing unit on the basis of actuation contents responsive to the image quality mode set by the operating unit and executes printing on a medium. Therefore, since, even if a feature capable of printing on a medium is added to a type having a plurality of image quality modes, the capture unit and print-executing unit can be actuated in accordance with the image quality mode when executing printing on a medium, functions by which respective image quality modes are satisfied can be secured, and functionality of the printing apparatus can be improved.

In at least one embodiment of the invention, the capture unit is a scanner device for reading images of the sample medium by scanning, wherein the controlling unit causes the scanner device to read images of the sample medium at a high resolution when the high resolution is selected as the image quality mode, and at the same time, causes the print-executing unit to print the images on the medium at a high resolution.

According to the construction, since scanning and printing can be carried out at a high resolution when the image quality mode is a high image quality mode, it becomes possible to print clear and fine images on a medium.

In at least one embodiment of the invention described above, the capture unit is a scanner device for reading images of the sample medium by scanning, wherein the controlling unit causes the scanner device to read images of the sample medium at a low resolution when a high speed mode is selected as the image quality mode, and at the same time, causes the print-executing unit to print the images on the medium at a low resolution. According to the construction, since scan printing can be carried out at a low resolution when the image quality mode is a high-speed mode, it becomes possible to print images on a medium in a short time.

In at least one embodiment of the invention, the capture unit is a scanner device for reading images of the sample medium by scanning, wherein the capture unit includes a memory unit for temporarily storing image data obtained by scanning of the scanner device, a measuring unit for measuring or metering the available memory volume of the memory unit, and a determining unit for determining whether or not the available memory volume of the memory unit decreases below a threshold value, and the controlling unit causes the scanner device to read images of the sample medium at a low resolution when it is determined on the basis of a result of determination made by the determining unit that the available memory volume of the memory unit is lower than the threshold value.

According to the construction, where the available memory volume of the memory unit decreases below the threshold value and the available memory volume of the memory unit is slight, scanning is carried out at a low resolution. If the available memory volume is not available in the memory unit for storing scanned image data, the scanner device stops in the process of scanning. However, since scanning is executed at a low resolution where the available memory volume of the memory unit is slight, the data volume captured by the scanner device also becomes only slight, wherein no shortage occurs in the memory even if the available memory volume is slight, and there is no inconvenience by which the scanner device stops in the process.

In at least one embodiment of the invention, the controlling unit causes the scanner device to read the images of the sample medium at a low resolution where it is determined on the basis of the result of determination made by the determining unit that the remaining memory volume of the memory unit is lower than the threshold value, and causes the print-executing unit to print the images on a medium at a resolution responsive to the image quality mode set by the operating unit. According to the construction, even if the available memory volume of the memory unit is short, printing on a medium can be carried out at an image level responsive to the image quality mode set by a user.

In at least one embodiment of the invention, the image data of the sample medium, which are captured by the scanner device, includes shadow portions produced by a scanning process around the outer circumference of the corresponding sample medium, and the image processing unit masks pixels of the shadow portions of the image data, and brings about data free from any color with respect to the medium when executing printing. According to the construction, when a sample medium is scanned by a scanner device, shadow portions of the sample medium are unavoidably produced in the image data. However, since the pixels of the shadow portions of the sample medium, which are produced by scanning, are masked, no shadow portion (black-colored portion) is printed on a medium when executing printing on the medium.

At least one embodiment of the invention is featured in that a method for recording on a medium used in a printing apparatus includes a capture unit for capturing images of a sample medium by scanning or reading data from a memory medium and an executing unit for executing printing on the basis of the image data captured by the capture unit, wherein image processing unit processes the image data captured by the capture unit in accordance with a printing range of a medium which is a subject on which printing is executed, and controlling unit actuates the capture unit and print-executing unit in accordance with the image quality mode set by the operating unit and prints the image data processed by the image processing unit onto the medium.

BRIEF DESCRIPTION OF THE DRAWINGS

FIG. 5 (*a*) is a conceptual view of a template, and (b) is a table for scan printing;

DETAILED DESCRIPTION OF THE PREFERRED EMBODIMENTS

Hereinafter, a description is given of one embodiment of a printing apparatus and a method for printing on a medium, in which the present invention is embodied.

Figure 1:
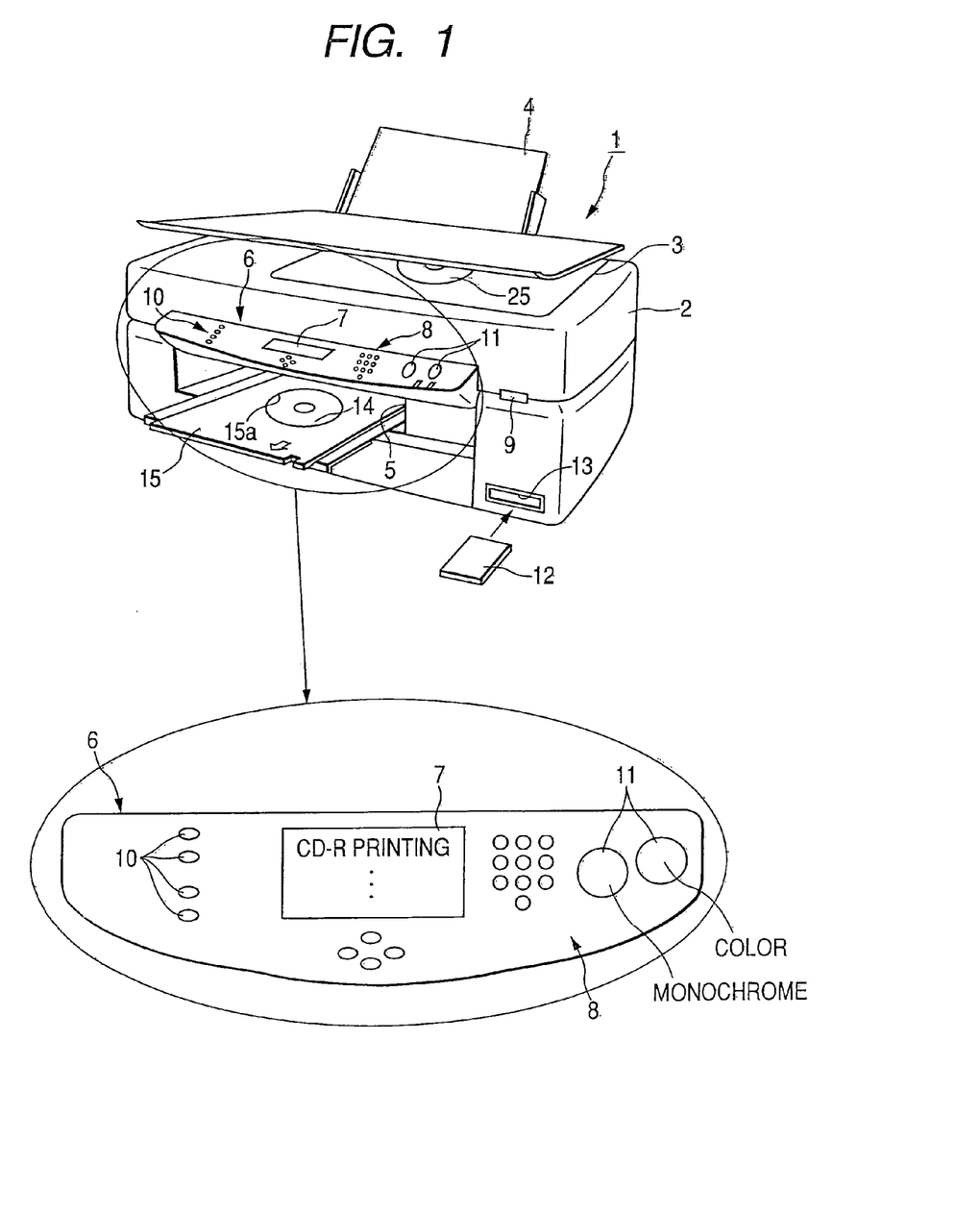
FIG. 1 is a perspective view of a printer according to one embodiment.

As shown in FIG. 1, a printer 1 serving as a printing apparatus is an ink jet type stand-alone printer capable of independently executing printing without being connected to a host computer. The printer 1 is capable of scan printing (duplicating) in which it scans a document (sample) placed on a document table 3 on the upper surface of a case 2, processes the document for printing, and delivers a sheet 4 of paper through a delivery port 5. Also, the printer 1 is also capable of scanning and reading by which scanned image data (scan data) are transmitted and printing print data are received from a host computer and outputting the same.

An operating panel portion 6 is disposed on the case 2 of the printer 1. An LCD (liquid crystal display) 7 and various types of switches 8, which are an operating unit, are disposed on the operating panel portion 6. The LCD 7 displays a menu function, printing conditions, operation contents, operating status, error contents, etc., of the printer 1. In addition, various types of switches 8 are a power source button 9 for turning on and off the power source, a selection button 10 for selecting a printing mode of the printer 1, and a printing start button 11 (two buttons for color and monochrome printing), which is pressed to commence a duplicating process and a scanning process.

A card slot 13 into which a memory card 12 being a memory medium is inserted is disposed at the right side lower part of the front side of the case 2. Images picked up by a digital camera, etc., are stored in the memory card 12 as image data of digital signals. The printer 1 reads the image data of the memory card 12 inserted into the card slot 13 and is capable of executing card printing by which the images selected from the images by operating the switches 8 are printed and outputted.

The printer 1 is also capable of executing CD-R printing which carries out a printing process on a CD-R 14 being a medium. In detail, a flat plate-shaped CD-R tray 15 which is a separate component from the printer 1 is prepared, and the CD-R 14 is placed in the hole portion 15*a* on a CD-R tray 15. And, the CD-R tray 15 is set in the printer 1. After that, the CD-R printing mode is selected by the selection button 10, and at the same time, the print starting button 11 is pressed to commence printing, wherein a printing process is executed with the upper surface of the CD-R 14 used as a printing range.

Figure 2:
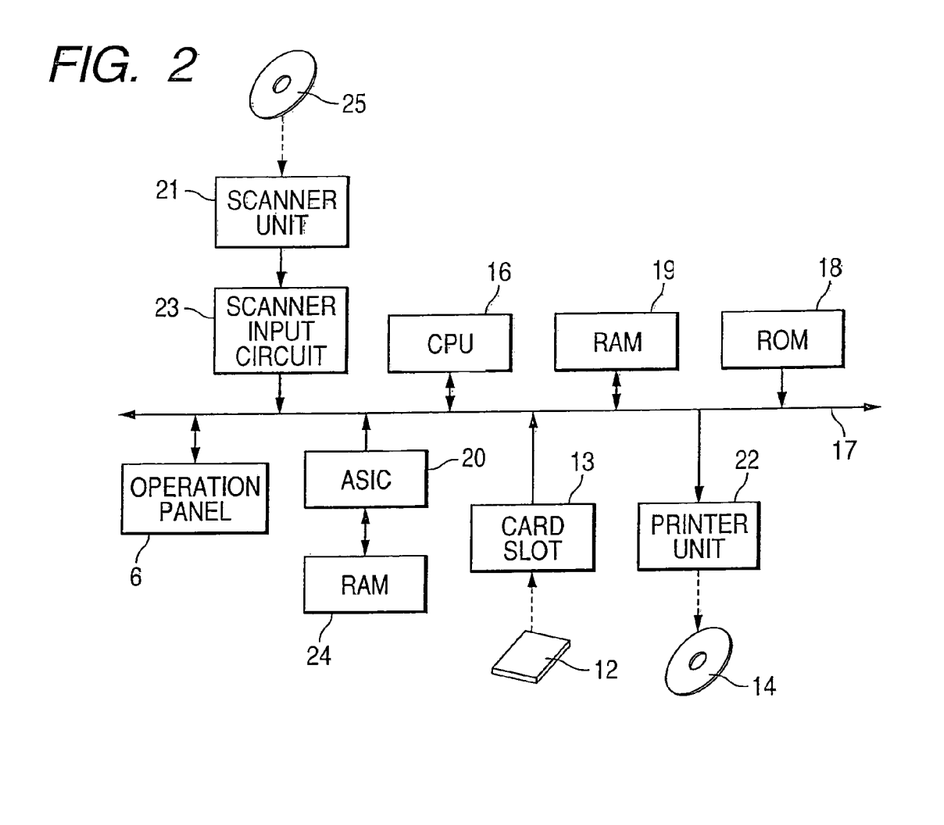
FIG. 2 is a block diagram showing an electric configuration of the printer.

As shown in FIG. 2, the printer 1 is provided with a CPU 16 in charge of main control. A ROM 18, RAM 19 for the CPU and ASIC 20 are connected to the CPU 16 via a bus 17. Also, the printer 1 is provided with a scanner unit 21 and a printer unit 22. The scanner unit 21 has an exposure lamp, CCD sensor, pulse motor, etc., and is connected to the bus 17 via a scanner input circuit 23. In addition, the printer unit 22 has a head, carriage motor, paper feeding motor, drive circuit, etc., and is connected to the bus 17. Further, the capture unit (scanner device) includes the scanner unit 21 and scanner input circuit 23. The print-executing unit has the printer unit 22.

The ROM 18 stores a control program for controlling the printer 1, scanner control parameters for driving the scanner unit 21, and printer control parameters for driving the printer unit 22, etc. The ROM 18 also stores a medium print-executing program which is executed by the CPU 16 when executing CD-R printing. Also, the image processing unit, a measuring unit and a determining unit includes the CPU 16 and medium print-executing programs, and the controlling unit has the CPU 16, ASIC 20 and medium print-executing programs.

A RAM 24 serving as a memory unit for ASIC is connected to the ASIC 20. The ASIC 20 carries out image processings on the image data picked up by scanning and image data read from the memory card 12, and transmits the image data to the head of the printer unit 22. The CPU 16 controls the scanner unit 21 via the scanner input circuit 23 on the basis of the scanner control parameters when actuating the scanner. When processing for printing, the CPU 16 controls the printer unit 22 on the basis of the processed image data and the printer control parameters and controls reading of the data when reading image data of the memory card 12.

Figure 3:
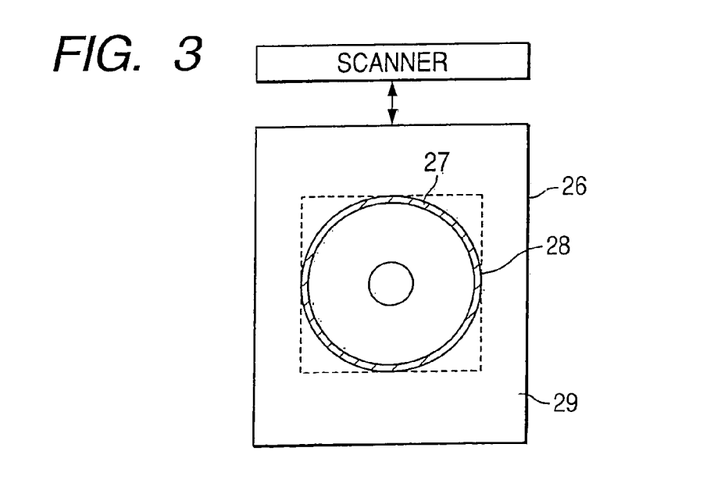
FIG. 3 is a descriptive view regarding image data acquired by pre-scanning.

Next, a description is given of CD-R printing by scanning in a stand-alone machine. First, a sample CD-R 25 serving as a sample medium is set on the document table 3, and simultaneously the CD-R tray 15 on which a non-printed CD-R 14 is placed is set in the printer. Subsequently, the printing mode is set to the CD-R printing mode by the selection button 10, the printing method in the mode is set to the scanning printing. In addition, the image quality mode is selected between the high image quality mode and high-speed mode. If the printing start button 11 is pressed in this state, the CPU 16 executes the CD-R printing described below on the basis of the medium print-executing program of the ROM 18.

Where the high image quality mode is selected in the image quality mode, first, the CPU 16 causes the scanner unit 21 to execute pre-scanning, and captures the image data 26 shown in FIG. 3. Based on the image data 26, it is determined on which part of the document table 3 the sample CD-R 25 is placed. Herein, since shadow portions (diagonal portions shown in FIG. 3) 27 are scanned if the sample CD-R 25 is scanned, the CD-R image 28 including the shadow portions 27 is determined to be the sample CD-R 25 in the image data 26. Further, since it is possible to distinguish the CD-R image 28 from the portion 29 which is not the CD-R image 28, the position of the sample CD-R 25 on the document table 3 can be understood by checking the outline of the CD-R image 28.

Continuously, the CPU 16 determines the regular scanning area on the basis of the scanning result of the pre-scanning. That is, the minimum square area (the area shown with broken lines in FIG. 3) in which the CD-R image 28 including the shadow portions 27 of the sample CD-R 25 is determined as the regular scanning area. The CPU 16 causes the scanner unit 21 to execute regular scanning, and reads the image data of the portion surrounded by the area shown with broken lines in FIG. 3 at the memory resolution (scanning resolution) responsive to the image quality mode. Herein, since the image quality mode is a high image quality mode, the sample CD-R 25 is scanned at the memory resolution X1 with a high resolution. The CPU 16 sequentially transfers the image data, which are read by the regular scanning, to the RAM 24 of the ASIC 20 line by line.

Here, the ASIC 20 re-arranges the image data equivalent to one line, which are written in the RAM 24, in a sequence that composes one raster line when the head scans, and transfers the same to the RAM 19 of the CPU 16. The transfer process is repeated until the process is completed for all the lines of the image data. Thereby, pixel data (RGB data) 30, shown in FIG. 4, responsive to the memory resolution X1 are generated in the RAM 19. The pixel data 30 includes pixels 30a of the shadow portions 27 of the sample CD-R 25, which are produced when scanning.

Figure 5A:
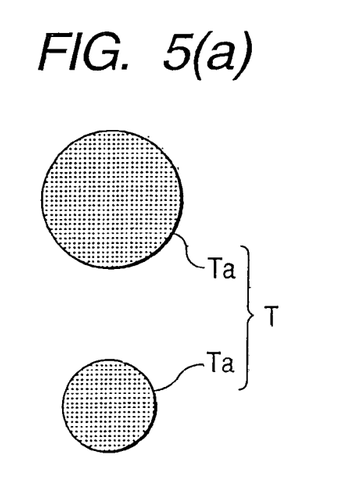

After the transfer process is completed, the CPU 16 carries out an image working process in regard to the pixel data 30 written in the RAM 19. Hereinafter, a detailed description is given thereof. A plurality of templates T (in this example, two templates), shown in FIG. 5(a), responsive to the diameter size of the CD-R 14 are stored in the ROM 18. The templates T of this example are a template Ta whose diameter is a 12 cm size and a template Tb whose diameter is an 8 cm size.

Figure 4:
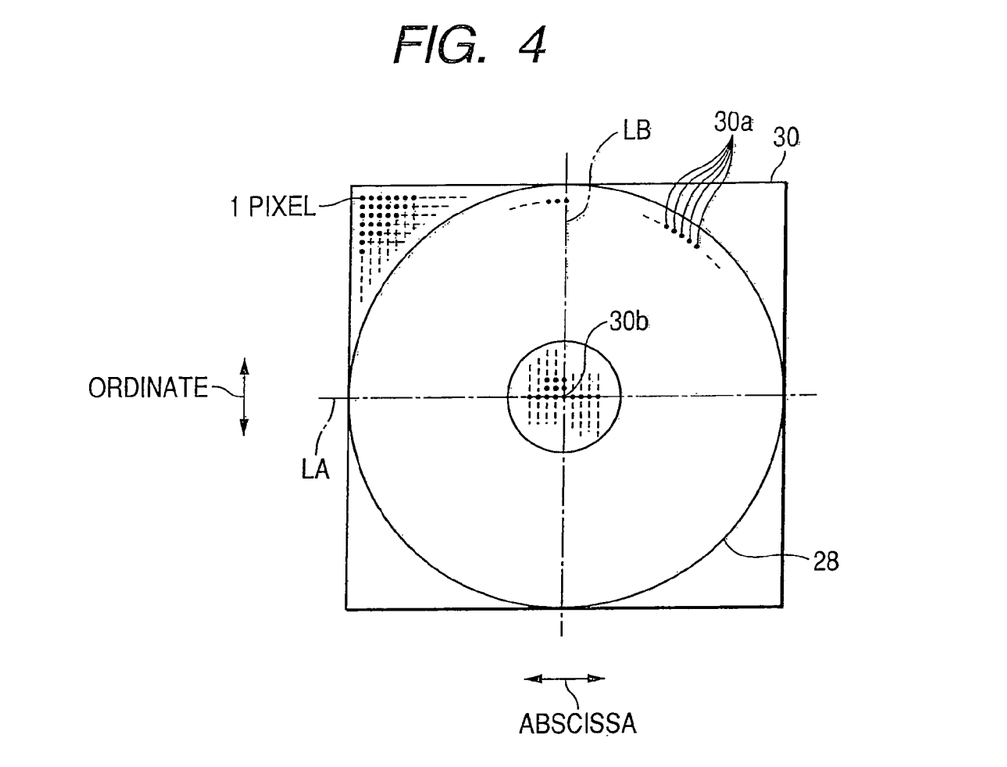
FIG. 4 is a descriptive view showing pixel data acquired by regular scanning.
Figure 5B:
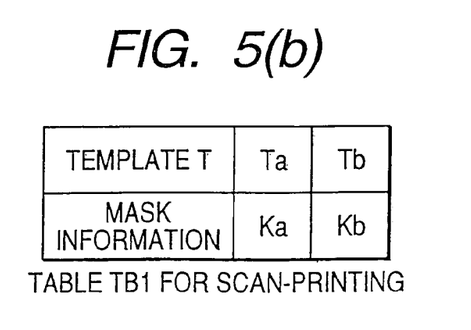

A table TB1 for scan printing, which is shown in FIG. 5(b), having mask information K for each of templates Ta and Tb written is stored in the ROM 18. The mask information K designates unnecessary pixels for printing when printing on the CD-R 14. The information determines to which pixels ink is not discharged to be white data, with the center point (center pixel) 30b of the CD-R used as the basis point on the pixel data 30 shown in FIG. 4. With respect to the mask information K of the example, Ka and Kb are stored in accordance with the respective templates Ta and Tb, and the mask information K designates respective pixels of the shadow portions 27 of the pixel data 30 shown in FIG. 6, the middle hole portion 31 of the sample CD-R 25, and outside portions (four corners) of the shadow portions 27.

The CPU 16 carries out a matching process using the template T as an image working process, compares the CD-R image (image including the shadow portions 27) of the pixel data 30 with the template T, and determines the size of the sample CD-R 25. In the present example, it is assumed that the size of the CD-R is a 12 cm size. Continuously, the CPU 16 obtains the number of pixels with respect to the ordinate and abscissa of the pixel data 30 as shown in FIG. 4 and calculates an intersection point between a line La, on which the intermediate pixel in the ordinate is positioned, and a line Lb, on which the intermediate pixel in the abscissa is positioned, as the center point 30b of the CD-R image 28.

Figure 6:
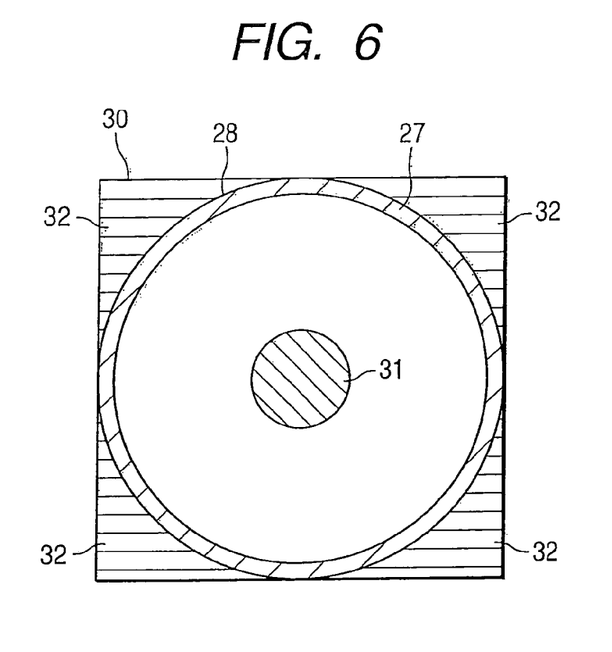
FIG. 6 is a descriptive view showing non-printing portions of the pixel data.

After the center point 30a is calculated, the CPU 16 carries out a masking process with reference to the table TB1 and establishes unnecessary portions of printing of the respective pixels of the pixel data 30 as white data (that is, data for which no ink is discharged). That is, using the mask information Ka of the table TB1, the CPU 16 recognizes the shadow portions 27, middle hole portion 31, and outside portion 32, which are shown in FIG. 6 and are not necessary to be printed, on the basis of the center point 30b of the CD-R image 28, and sets these pixels as white data to which no ink is discharged. And, the CPU 16 transmits the pixel data 30 to the ASIC 20 after the masking process is over.

The ASIC 20 executes an image processing on the pixel data 30 and generates head drive data in which data are arranged in the sequence of ink discharge. Hereinafter, a detailed description is given thereof. First, the ASIC 20 converts the pixel data 30 inputted by scanning to a printing resolution responsive to the image quality mode. Herein, since the image quality mode is set to a high image quality mode, the pixel data 30 are converted to the high resolution as the printing resolution.

The ASIC 20 binarizes the RGB-based pixel data and converts the same to YMCK-based pixel data (YMCK data). Continuously, the ASIC 20 executes a microweaving process of the YMCK data and generates head drive data equivalent to one scan, which is to be processed for printing when the head scans one time. The head drive data are binary data for instructing discharge or non-discharge of ink to respective nozzles of the head and a discharge amount thereof thereto, wherein no ink is discharged to the pixels masked in the masking process.

A description is given of the microweaving process. Since the head of the printer unit 22 forms dots at the nozzle pitch in the feeding direction of paper 4 (the subscanning direction), rasters of continuous numbers cannot be formed by the main scanning carried out at one time. Therefore, the raster forming positions are shifted whenever forming rasters while forming a plurality of rasters at intervals of the nozzle pitch in respective main scanning, and spaces between the rasters are filled by other rasters, and, finally, continuous rasters are formed. This process is called a "microweaving process."

After that, whenever head drive data equivalent to scanning of one time are stored in the RAM 24, the ASIC 20 outputs the stored data to the printer unit 22 one after another. The CPU 16 drives the head on the basis of the head drive data, and at the same time, executes printing on the CD-R 14 by driving a carriage motor and a paper feeding motor on the basis of the printer control parameters. Through the above-described procedure, an image is printed on the CD-R 14 with no shadow portion provided and unnecessary portions decolored.

Herein, since the image quality mode is a high image quality mode, it is necessary that the image printed on the CD-R 14 is sharp and fine. Therefore, in the case of the high image quality mode, it is composed that the sample CD-R 25 is scanned at a high resolution (memory resolution X1) and the image is printed on the CD-R 14 at a high resolution (printing resolution Y1), wherein it becomes possible that an image is printed on the CD-R 14 at an image level in which a high image quality mode is enabled.

However, since the RAM 24 is used for operations other than the scanning, it is considered that the available memory amount M becomes short when scanning is executed. Therefore, the CPU 16 minutely checks the available memory amount M of the RAM 24 of the ASIC 20. When the CPU 16 determines that the available memory amount M is reduced below the predetermined threshold value Ma and is slight at the moment when commencing scanning, an image in the regular scanning area is read at a low memory resolution X2 (<X1) in the regular scanning. Thereby, it becomes possible to secure and store the scanned image data even if the available memory amount M is slight, and such an inconvenience does not occur, which causes the scanning to be interrupted in process due to a cause of memory shortage in the RAM 24.

On the other hand, where a high-speed mode is selected as the image quality mode, the CPU 16 causes pre-scanning and regular scanning to be carried out. However, the image data in the regular scanning area shown with broken lines in FIG. 3 are read at the memory resolution X2 with a low resolution in the regular scanning. As described above, since the image is scanned at a low resolution, the scanning time can be shortened. And, as in the high image quality mode, the CPU 16 carries out an image working process on the image data captured by the regular scanning and transfers the pixel data 30, for which pixels unnecessary for printing are masked, to the ASIC 20. The ASIC 20 carries out an image processing on the pixel data 30 and generates head drive data at the printing resolution Y2 (<Y1) with a low resolution.

Whenever the ASIC 20 generates the head drive data corresponding to one-time scanning of the head, the ASIC 20 transfers the same to the printer unit 20. The CPU 16 drives the head on the basis of the head drive data transferred by the ASIC 20, and at the same time, executes printing on the CD-R 14 by driving the carriage motor and paper feeding motor on the basis of the printer control parameters. Therefore, since printing is carried out at a low resolution, the printing time is shortened. In addition, memory resolutions X1 and X2 are changed by varying the scanning speed, etc., and the printing resolutions Y1 and Y2 are changed by varying the head scanning speed and paper feeding rate.

Figure 7:
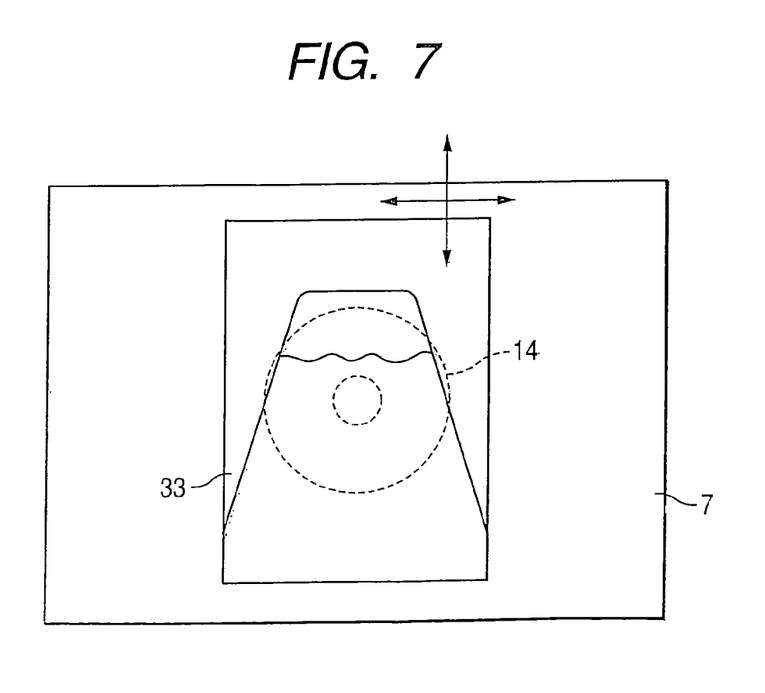
FIG. 7 is a screen view of an LCD when carrying out card printing.

Next, a description is given of CD-R printing by card reading in a stand-alone machine. A user inserts a memory card 12 into a card slot 13, and selects an image (sample image) desired to be printed out from images of the memory card 12. Using various types of switches 8, a printing image 33 and its layout information R are set by moving the printing image 33 in the up and down directions, and left and right directions with respect the reference position of printing (CD-R 14), or changing its printing size by enlargement or contraction as shown in FIG. 7. At this time, the diameter size of the CD-R 14 to be printed is established.

After these conditions are established, the printing mode is set to the CD-R printing mode by operating the selection button 10, and the printing method in the mode is set to a card printing method, that is, a method for printing on the CD-R 14 on the basis of the image data read from the memory card 12. If the printing start button 11 is pressed after various types of printing conditions are established, the CPU 16 executes CD-R printing, which is described below, on the basis of a medium print-executing program of the ROM 18.

Figure 8:
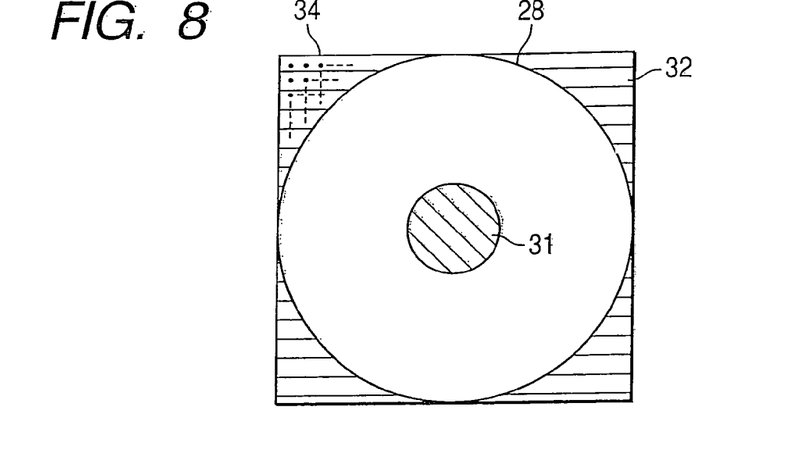
FIG. 8 is a descriptive view showing pixel data acquired when data are expanded.

First, the CPU 16 reads layout information R set by the user, and determines the position and printing size on the CD-R 14 of the printing image 33. Continuously, the CPU 16 reads the printing image 33 from the memory card 12. The CPU 16 develops the read image data in accordance with the position and printing size based on the layout information R, and generates pixel data (RGB data) 34, shown in FIG. 8, the range of which is the minimum square in which the CD-R 14 can be accommodated. The pixel data 34 includes the middle hole portion 31 and the outside portion 32 of the CD-R image, which are unnecessary for printing. However, no shadow portion 27 is provided.

Figure 9:
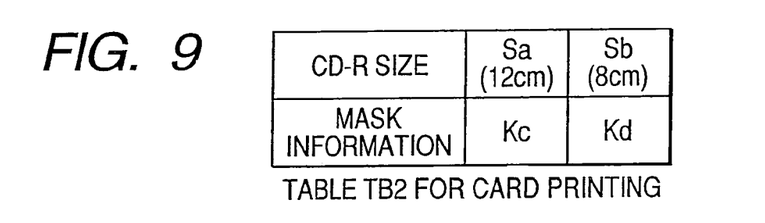
FIG. 9 is table for card printing.

Also, the ROM 18 includes a table TB2 for card printing, which is shown in FIG. 9. The mask information K of the table TB2 is stored as Kc and Kd in accordance with the diameter sizes Sa (12 cm) and Sb (8 cm) of the CD-R 14, and is the information designating pixels of the middle hole portion 31 of the pixel data 34 shown in FIG. 8 and the pixels of the outside portion 32 of the CD-R image 28. Where the size of the CD-R 14 is determined to be Sa, the CPU 16 executes a masking process on the basis of the mask information Kc by the method similar to that in the case of scan printing, wherein portions unnecessary to be printed out of the pixel data 34 are set to be white data (data for which no ink is discharged).

In addition, the CPU 16 transfers the mask-processed pixel data 34 to the ASIC 20. The ASIC 20 executes an image processing on the pixel data 30 and generates head drive data at a printing resolution Y1 of a high resolution. If described in detail below, the ASIC 20 executes a resolution converting process, binarizing process and microweaving process with respect to pixel data 34 inputted by card reading, thereby sequentially generating head drive data equivalent to one-time scanning. Also, as soon as the head drive data corresponding to one-time scanning are stored in the RAM 24, the ASIC 20 outputs the same to the printer unit 22 one after another, and causes the printer unit 22 to execute CD-R printing.

Figure 10:
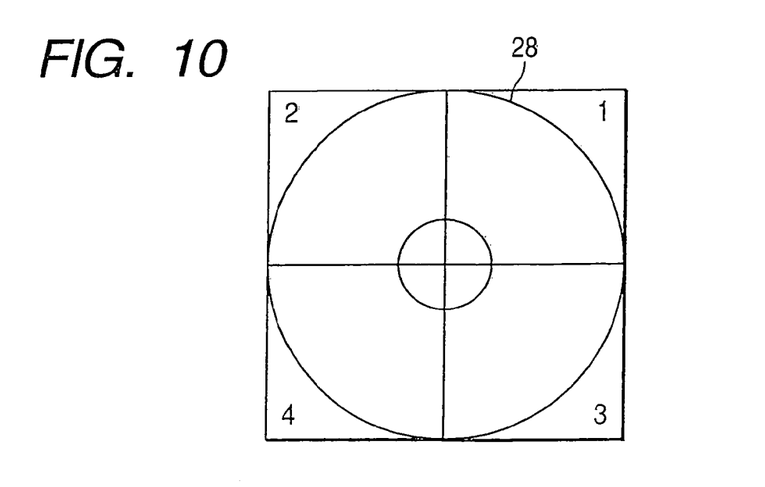
FIG. 10 is a descriptive view for printing a plurality of images onto a single CD-R.

Further, where it is set that a plurality of images are printed on a single CD-R 14 in the card printing, the CPU 16 processes the combination information as layout information R, and a plurality of images are printed on the CD-R 14 as a single image on the basis of the layout information R. For example, as shown in FIG. 10, where four images are combined and printed thereon, images arranged two by two in both vertical and horizontal directions are recognized as a single image. An image working process and an image processing, etc., are carried out with respect to the image, and head drive data necessary for CDR printing are generated, wherein an image corresponding to the four images is printed on the CD-R.

Figure 11:
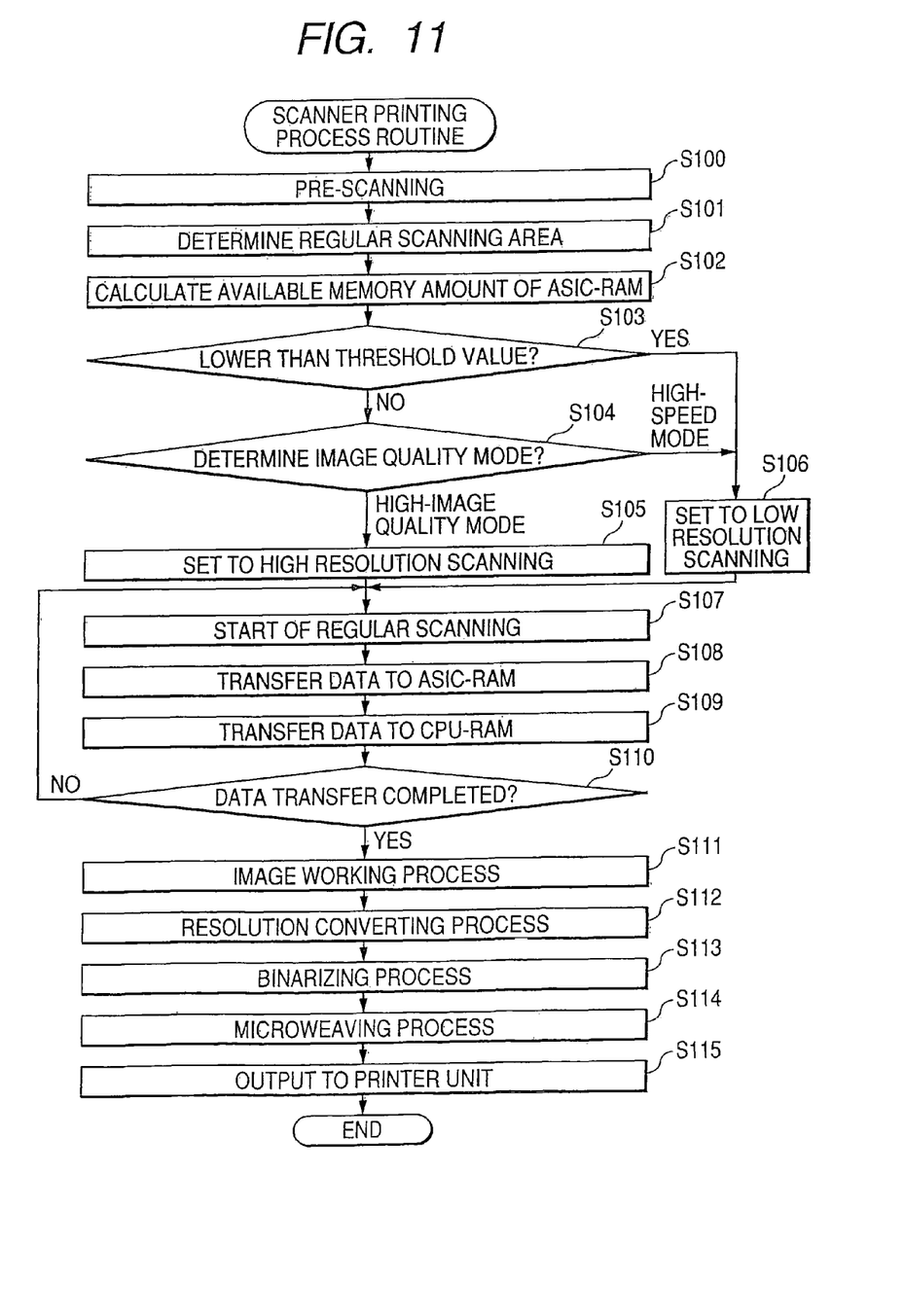
FIG. 11 is a flow chart for printing on CD-R based on scanning.

Next, a description is given of procedures for executing CD-R printing by scanning by CPU 16, in accordance with a flow chart shown in FIG. 11.

In Step 100, prescanning is carried out, whereby it is determined on which part of the document table a sample CD-R is placed.

In Step 101, a regular scanning area is determined. That is, although shadow portions 27 of the sample CD-R are captured when scanning, the minimum square area (the area shown with broken lines in FIG. 3) in which the CD-R image 28 including the shadow portions 27 is covered is determined as the regular scanning area.

In Step 102, the available memory amount M of the RAM 24 of the ASIC 20 is calculated.

In Step 103, it is determined whether or not the available memory amount M calculated in Step 103 is lower than the threshold value Ma. If M<Ma is established, the process advances to Step 104, and if M≧Ma is established, the process advances to Step 106.

In Step 104, the image quality mode is determined. That is, it is determined which image quality mode of a high image quality mode or a high-speed mode is selected. Herein, if the high image quality mode is selected, the process advances to Step 105, and if the high-speed mode is selected, the process advances to Step 106.

In Step 105, high resolution scanning is set. That is, the memory resolution (scanning resolution) is set to X1 the resolution of which is high.

In Step 106, low resolution scanning is set. That is, the memory resolution (scanning resolution) is set to X2 the resolution of which is low.

In Step 107, regular scanning is commenced. That is, the entire scanning area of the sample CD-R placed on the document table 3 is scanned at a resolution responsive to the image quality mode.

In Step 108, image data are transferred to the RAM 24 of the ASIC 20.

In Step 109, image data are transferred to the RAM 19 of the CPU 16.

In Step 110, it is determined whether or not the data transfer is completed. If the transfer is completed, pixel data (RGB data) 30, shown in FIG. 4, responsive to the size of the sample CD-R 25 are generated. Here, if the data transfer is completed, the process advances to Step 111, and if not, the process returns to Step 107, wherein the data transfer is continued.

In Step 111, an image working process is executed with respect to the pixel data 30 written in the RAM 19 of the CPU 16. Here, the center point 30b of the pixel data 30 is determined by a matching process. Based thereon, a masking process is carried out to mask portions unnecessary to be printed in the pixel data 30.

In Step 112, the ASIC 20 is caused to execute a resolution converting process. That is, scanned pixel data 30 are converted to a printing resolution in accordance with the image quality mode, wherein, when a high image quality mode is employed, the data are converted to the printing resolution Y1 with a high resolution, and when a high-speed mode is employed, the data are converted to the printing resolution Y2 with a low resolution.

In Step 113, the ASIC 20 is caused to execute a binarizing process, wherein RGB-based pixel data 30 are converted to YMCK data.

In Step 114, the ASIC 20 is caused to execute a microweaving process.

In Step 115, the pixel data 30 subjected to the microweaving process are outputted to the printer unit 22 and CD-R printing is carried out.

Figure 12:
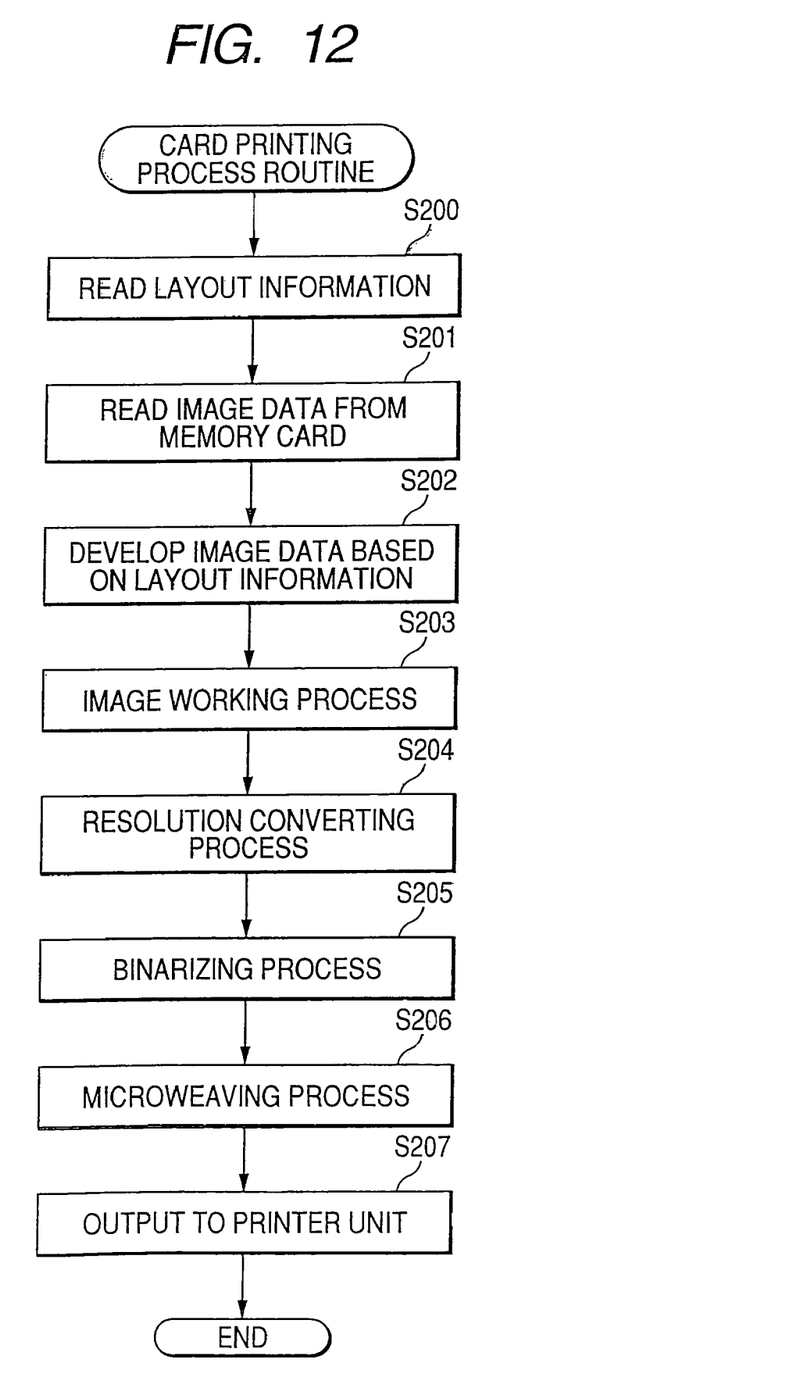
FIG. 12 is a flow chart for printing on CD-R based on card reading.

Next, a description is given of procedures for the CPU 16 to execute CD-R printing by card reading, with reference to a flow chart shown in FIG. 12.

In Step 200, layout information R established by a user is read.

In Step 201, image data are read from the memory card 12. That is, image data of an image pointed out by a user are read from the memory card 12.

In Step 202, the image data are developed on the basis of the layout information R. That is, the read image data are developed in accordance with the position and printing size based on the layout information R, thereby generating pixel data (RGB data) 34, shown in FIG. 8, with the minimum square used as a range, in which the CD-R 14 is accommodated.

In Steps 203 through 207, processes similar to those in Steps 111 through 115 described above are carried out.

According to the present example, although a shadow portion 27 is produced in the image data of the scanned sample CD-R 25 due to the thickness thereof, the pixels of the shadow portions 27 are masked to be white data for which no ink is discharged. In addition thereto, pixels corresponding to the hole portion 31 and the outside portion 32 of the CD-R 14, which are not required to be printed, are also masked. Therefore, even if CD-R is printed by scanning, portions not required to be printed such as the shadow portions 27, hole portion 31 and outside portion 32 are not outputted or printed, and only the images to be projected are printed on the CD-R 14.

Also, only portions, required for CD-R printing, of the image data read from the memory card 12 are taken out and the data there are developed. The data are image-processed and printed on the CD-R 14. Therefore, no ink is discharged on the portions not required to be printed, and only the images to be projected are printed on the CD-R 14 as in the scan printing. Based on the above description, the scanned image and image read from the memory card 12 can be outputted and printed on the CD-R 14 in a favorable state.

Further, there are two types in the image quality modes of the printer 1, one of which is a high image quality mode and the other of which is a high-speed mode. In the high image quality mode, it is necessary to print sharp and fine images on the CD-R 14, and, in the high-speed mode, it is necessary to shorten the printing time. Therefore, when the high image quality mode is employed, scanning and printing are carried out at a high resolution, and when the high-speed mode is employed, scanning and printing are carried out at a low resolution. Operation contents of the scanner unit 21 and printer unit 22 are altered in accordance with the respective modes. Therefore, even if CD-R printing is independently enabled by a single printer, functions which are satisfied by the respective modes are secured, and functionality of the printer 1 is improved.

According to the above-described embodiments, the following effects can be brought about.

(1) Such a composition is employed, in which image data 26 captured by scanning and card reading are subjected to image processing, pixels not required to be printed are masked, and CD-R printing is carried out on the basis of the data thus obtained. Therefore, it is possible to execute CD-R printing by a stand-alone machine employing scan printing and card printing. Also, since the operation contents of the scanner unit 21 and printer unit 22 can be altered in accordance with the image quality modes (high image quality mode and high-speed mode), functions which are satisfied by the respective modes, that is, high image quality printing in the high image quality mode, shortening of the printing times in the high-speed mode are secured, and the functionality of the printer 1 is improved.

(2) Such current situations exist, in which when the RAM (line buffer) 24 for accommodating the scanned image data 26 becomes short in terms of memory, the scanning is interrupted at that time, and a normal scanning process cannot be carried out. However, since scanning is carried out at a low resolution when the available memory amount M is determined and the available memory amount M becomes lower than the threshold value Ma, only the amount of data captured by the scanning may be slight, wherein there is no inconvenience that the scanning is interrupted due to shortage of the memory. In addition, since printing is carried out at a printing resolution responsive to the image quality mode in the case of a shortage in memory, CD-R printing can be carried out at an image level responsive to respective image modes even under a condition where it is determined that the memory is short.

(3) It is composed that the ROM 18 is provided with tables TB1 and TB2 in which mask information K is written for each of the sizes (in this example, two sizes) of the CD-R 14, and a masking process is carried out on the basis of these tables TB1 and TB2. Therefore, images of the sample CD-R 25, which are captured by scanning, and images read from the memory card 12 can be printed in different sizes of CD-R 14.

(4) Where card printing is carried out, the position of the printing image in the up, down, left and right directions and printing size thereof, which are established by the operation panel portion 6 are reflected on the CD-R printing. Therefore, it is possible for a user to execute CD-R printing at the printing position and printing size in accordance with his/her needs.

(5) When the card printing is carried out, since it is possible to recognize a plurality of images as a single printing image, a printing image in which a plurality of images are combined can be printed on the CD-R 14.

(6) Since the printer 1 has both the scanner feature and card-reading feature, it is possible to carry out scan-printing and card-reading and printing with a single unit of the printer 1.

Furthermore, the above-described embodiment may be subjected to the following modifications.

Modified Example 1

The sizes of the CD-R 14 are not limited to two types. The size(s) may be one type or three or more types.

Modified Example 2

The sample medium is not limited to a CD-R. For example, medium other than the CD-R, such as, for example, DVD-R, etc., may be employed. The sample medium is not limited to a medium, in which digital signals can be written, such as a CD-R. It may be a medium if it has a thickness to such a degree that shadow portions are produced when scanning.

Modified Example 3

The image quality mode is not limited to two types which are high image quality mode and high-speed mode, and other mode(s) may be employed. For example, the mode(s) may be three or more types for which the high image quality mode is made to have multiple steps.

Modified Example 4

When the image quality mode is a high-speed mode and the RAM 24 is short in memory in scanning, the scanning is not limited to low resolution scanning (memory resolution X2). The memory resolutions at this time may be values differing from each other.

Modified Example 5

It may be composed that threshold values Ma which are used to determine the memory storage of the RAM 24 in scanning are stepwise provided in a plurality and the sample CD-R 25 is scanned at memory resolutions responsive to the result of determination. That is, where it is determined that the memory capacity becomes lower than the lowest threshold value Ma, the scanning is carried out at the lowest memory resolution, and where it is determined that the memory capacity is lower than the second lowest threshold value Ma, the scanning is carried out at the second lowest memory resolution.

Modified Example 6

When the RAM 24 is short in memory when scanning, the printing is not limited to printing at a printing resolution responsive to the image quality mode at that time. For example, the entire image is outputted and printed at a low resolution regardless of the image quality mode.

Modified Example 7

The CD-R tray 15 is not limited to a component which is separate from the printer 1. For example, it may be a type integrally formed with the printer 1.

Modified Example 8

It is not necessary that the printer 1 has both a scanner feature and a card-reading feature as a single unit. It may be provided with either one of these.

Next, a description is given below of the technical idea or thought which can be comprehended from the above-described embodiment and modified examples along with the effects thereof.

(1) In the invention, the above-described sample medium is shaped to be like a circular disk as its outer shape and to have a hole portion at the center thereof, and the above-described image processing unit masks pixels of the shadow portions of the above-described sample medium, central hole portion (31) thereof and outside portion (32) of the shadow portions, which are portions not required to be printed, and makes the pixels into data for which no color is provided on the medium when printing.

(2) The invention is provided with unit (16) for identifying sizes of the sample medium, and the image processing unit masks the pixels of the shadow portions responsive to the size of the above-described sample medium of the image data on the basis of the result of identification made by the identifying unit.

(3) In the invention, the capture unit is a reading device (13) which takes in images by reading image data stored in the above-described memory medium.

(4) In the invention, the above-described image processing unit sets an area corresponding to the printing area of the above-described image data read by the reading device as an area to be printed, on the basis of the printed area of the above-described medium, which is a subject to be printed, and on the basis of the result of setting, the image processing unit develops image data of pixels corresponding to the above-described printing area, and, when printing, masks pixels protruding from the above-described medium as portions not required to be printed.

(5) In the invention, the operating unit is operated when selecting and setting layout information (R) of an image printed onto the above-described medium, and the above-described image processing unit develops image data of pixels corresponding to the above-described printing area by reflecting the layout on the basis of the above-described layout information (R) set by the above-described operating unit.

What is claimed is:

1. A printing method comprising:
    scanning a rectangular region to obtain a scanned image of the rectangular region, the rectangular region including:
        a first medium shaped in a disk shape and disposed on a document table,
        a shadow portion of an edge portion of the first medium,
        a middle hole portion of the first medium, and
        a part of the document table placed outside the first medium;
    designating a part of the scanned image as a non-printing region in accordance with a kind of a second medium, the non-printing region being a region of the scanned image that is not to be printed on the second medium; and
    printing the scanned image without the non-printing region of the scanned image on the second medium,
    wherein the non-printing region includes a region corresponding to at least one of the shadow portion of the edge portion of the first medium, the middle hole portion of the first medium, and the part of the document table placed outside the first medium.

2. The printing method according to claim 1, wherein each of the first medium and the second medium is a CD-R or a DVD-R.

3. The printing method according to claim 2, wherein the kind of the second medium is determined by setting a CD-R scan-print mode or a DVD-R scan-print mode.

4. The printing method according to claim 1, wherein the non-printing region is designated based on non-printing region information prepared in accordance with the kind of the second medium, and based on a size of the first medium in length and width derived from the scanned image of the first medium.

5. The printing method according to claim 4, wherein the non-printing region information is stored in a ROM.

6. The printing method according to claim 4, wherein the non-printing region information is mask information and wherein the center of the first medium is determined by the size of the first medium in length and width derived from the scanned image of the first medium, and a mask is applied with reference to the center of the first medium.

7. The printing method according to claim 1, wherein the scanning step includes a second scanning step and a first scanning step executed prior to the second scanning step, the position of the first medium on the document table is judged based on the first scanning step, and the scanned image is obtained during the second scanning step.

8. The printing method according to claim 1, wherein the non-printing region is designated based on mask information prepared in accordance with the kind of the second medium, and based on a size of the first medium in length and width derived from the scanned image of the first medium.

9. The printing method of claim 1, wherein the step of designating a part of the scanned image as a non-printing region is performed without user input.

10. The printing method according to claim 1, further comprising:
    selecting a high image quality mode or a high-speed mode,
    wherein, in a case where the high image quality mode is selected, the first medium is scanned at a high resolution and the scanned image is printed on the second medium at a high resolution,
    wherein, in a case where the high-speed mode is selected, the first medium is scanned at a low resolution and the scanned image is printed on the second medium at a low resolution.

* * * * *